United States Patent [19]
Hagen et al.

[11] Patent Number: 6,027,144
[45] Date of Patent: Feb. 22, 2000

[54] PLUG-IN CONNECTOR FOR PRESSURE MEDIUM SYSTEMS

[75] Inventors: Harald Hagen, Wipperfürth; Volker Kaminski, Halver; Manfred Berg, Wipperfürth, all of Germany

[73] Assignee: Armaturenfabrik Hermann Voss GmbH + Co., Wipperfurth, Germany

[21] Appl. No.: 08/934,621

[22] Filed: Sep. 19, 1997

[30] Foreign Application Priority Data

Sep. 20, 1996 [EP] European Pat. Off. ............... 96115202

[51] Int. Cl.[7] ...................................................... F16L 35/00
[52] U.S. Cl. ............................ 285/93; 285/321; 285/906; 285/910; 285/918; 285/924
[58] Field of Search ............................... 285/93, 924, 321, 285/906, 910, 918

[56] References Cited

U.S. PATENT DOCUMENTS

| | | | |
|---|---|---|---|
| 3,584,902 | 6/1971 | Vyse ..................................... | 285/924 X |
| 3,718,350 | 2/1973 | Klein ..................................... | 285/924 X |
| 3,929,357 | 12/1975 | DeVincent et al. ................... | 285/924 X |
| 4,707,000 | 11/1987 | Torgardh .............................. | 295/924 X |
| 4,923,221 | 5/1990 | Taylor .................................. | 285/924 X |

FOREIGN PATENT DOCUMENTS

| | | |
|---|---|---|
| 0 226 689 | 7/1987 | European Pat. Off. . |
| 0 330 350 | 8/1989 | European Pat. Off. . |
| 2 437 546 | 4/1980 | France . |
| 29 22 869 | 12/1980 | Germany . |
| 714028 | 8/1954 | United Kingdom ..................... 295/93 |
| 867749 | 5/1961 | United Kingdom ..................... 285/93 |

*Primary Examiner*—Dave W. Arola
*Attorney, Agent, or Firm*—Jones & Askew

[57] ABSTRACT

The present invention relates to a pressure medium plug-in connector, consisting of two connector parts, i.e. a housing part (2) and a plug part (4), wherein the plug part (4) with a plug shaft (6), via at least one peripheral seal (10) located in an annular groove (14) of the one connector part (4) and interacting with a peripheral sealing surface (18) of the other connector part (2), can be inserted in a sealed manner into a receiving opening (8) of the housing part (2) and can be secured against release by means of a locking arrangement (12). The locking arrangement (12) is constructed in such a way that a partially plugged, prelocked position and a completely plugged, fully locked position are ensured. In the prelocked position, a seal is present which is so incomplete that, if pressure is applied with a pressure medium, a clearly limited perceptible leak, particularly in the form of an audible leaking sound, occurs. In the fully locked position, via the peripheral seal (10) resting against the sealing surface (18), a complete, pressure-tight seal is present. The area of the peripheral seal (10) and/or of the sealing surface (18) is constructed in such a way that the peripheral seal (10), located in the annular groove (14) of the one connector part (4)—in the prelocked position [and] via peripherally distributed contact points (20) arranged a distance apart—rests in radial direction against the other connector part (2), wherein respectively in peripheral direction, between the contact points (20), axial leakage paths (22) are formed. Hereby, the peripheral seal (10) is protected against a tearing out brought about by the flow.

13 Claims, 5 Drawing Sheets

PLUG-IN CONNECTOR FOR PRESSURE MEDIUM SYSTEMS

The present invention concerns a plug-in connector particularly for pneumatic pressure medium systems, consisting of two connector parts, i.e., a housing part and a plug part, wherein the plug part, while sealed via at least one peripheral seal, located in an annular groove of the one connector part and interacting with a peripheral sealing surface of the other connector part, can be inserted with a plug shaft into a receiving opening of the housing part and is secured by means of a locking arrangement against loosening, wherein the locking arrangement is constructed in such a way that a partially plugged in, prelocked position and a completely plugged in, fully locked position are ensured, wherein, in the prelocked position, a seal is present which is incomplete to the extent that if pressure is applied via a pressure medium, particularly compressed air, a clearly defined, perceptible leak occurs, particularly in the form of an audible leaking sound, and wherein in the fully locked position, via the peripheral seal resting against the sealing surface, a complete, pressure-tight seal is present. Such plug-in connectors are used, for example, in motor vehicle brake systems, particularly with air brake systems for trucks. Specifically, but not exclusively, for this application, there exists the problem that in some cases, for example, where there are unfavorable space or installation conditions, the installer does not take sufficient care to ensure a correct, complete plugging-in, so that in practice, testing procedures must be included in order to prevent the connection from suddenly becoming separated inadvertently during the application of pressure, such as during the build-up of braking pressure.

From EP-B1-0 226 689, a "connector arrangement" of this type is known in which, for the purpose of preventing the described problems, already in the not entirely correctly plugged-in condition of the connector parts, a "prelocking" is ensured which prevents the connection from becoming entirely separated when pressure is applied. In this prelocked position, leakage is ensured, so that this condition can be perceived audibly by means of a leaking sound without there occurring a complete, sudden drop in pressure. Then, in the presence of the leaking sound, the connection may be directed further into the correctly sealed and locked "fully locked position." With the known connection arrangement, the leakage is ensured in the prelocked position in that between the peripheral seal, located in the annular groove of the one connector part, and the other connector part or its sealing surface, an axial distance and hence a corresponding annular gap are present. However, the problem may arise that due to the leakage flow, the peripheral seal is "ruptured" (washed out or blown out) from the annular groove, so that upon subsequent transfer of the connection into the fully locked position, a pressure-tight seal can no longer be guaranteed.

It is the task of the present invention to create a plug-in connector of this type in which a flawless sealing function is ensured in the fully locked position, even if in the prelocked position, pressure applications and the defined leakages caused thereby have occurred.

This is achieved in accordance with the invention in that the area of the peripheral seal and/or the sealing surface is constructed in such a way that the peripheral seal, located in the annular groove of the one connector part, rests against the other connector part via contact points in the radial direction which are arranged peripherally at a distance from each other and, in the peripheral direction between the contact points, axial leakage paths are formed respectively.

By means of the radial contact of the peripheral seal in the peripherally distributed contact points, in accordance with the invention, already in the prelocked position, a zonal gripping or meshing of the peripheral seal inside its annular groove is achieved, whereby, advantageously, a very high degree of safeguarding against "blowing out" or "washing out" of the seal from the annular groove is attained. Nevertheless, the function of the "defined, perceptible leak" in the prelocked position is maintained. If the connection is then transferred from the prelocked position, through continued plugging in, into the fully locked position then, by means of the peripheral seal, maintained securely in its position inside the annular groove, the pressurized seal is always ensured.

In a first, advantageous embodiment of the invention, the effect in accordance with the invention is achieved by means of a special construction of the peripheral seal which for this purpose, consists of a special elastic profile ring which is divided into two axially adjacent areas, i.e., into a sealing area, distributed along its periphery, having an annular cross section which is essentially constant along its periphery, as well as a leakage area, made up of contact sections which alternate with each other in the peripheral direction and form the contact points, and of radial leakage recesses forming the leakage paths. The profile ring is then arranged in the prelocked position with the sealing area in the area of a second expanded ring slot, formed between the plug shaft and the receiving opening abutting against the sealing surface, and is positioned axially with the leakage area within the area of the sealing surface of the respective connector part, interacting in the fully locked position with the sealing area in a sealing manner. Hereby, a leakage flow in the prelocked position in the area of the sealing surface can escape to the outside axially through the leakage recesses and then slightly radially towards the outside and axially past the sealing area of the peripheral seal.

In a second embodiment of the invention, alternatively thereto, a special embodiment of the connector part having the sealing surface is provided, wherein advantageously an essentially "normal" peripheral seal, particularly a typical O-ring, can be used. For this purpose, the connector part having the sealing surface has axially adjacent to the sealing surface a leakage area with contact sections, alternating with each other in the peripheral direction, and with leakage recesses. The peripheral seal is then arranged in the prelocked position inside the leakage area and in the fully locked position in the area of the abutting sealing surface.

In a third embodiment, which is also possible within the framework of the invention, the sealing surface and the leakage area are formed at the outer periphery of the plug shaft, wherein the leakage area may be formed very simply and at low manufacturing costs, for example, by means of a peripheral knurling of essentially axially extending, ridge-like elevations and groove-like recesses located between them and forming the leakage paths. The peripheral seal is located here in an interior annular groove within the receiving opening of the housing part.

Further advantageous characteristics of the embodiment of the invention are contained in the following description.

By means of several preferred examples, the invention is to be explained in greater detail in the following text. Shown are FIG. 1 shows a first embodiment of a plug-in connector in axial cross section in accordance with the invention, wherein the left half of the figure shows the fully plugged in, fully locked position and the right half of the figure shows the partially plugged in prelocked position;

In the various figures equivalent parts are always provided with the same reference numerals and, for that reason, as a rule, are described only once in the following text.

Figure 1:
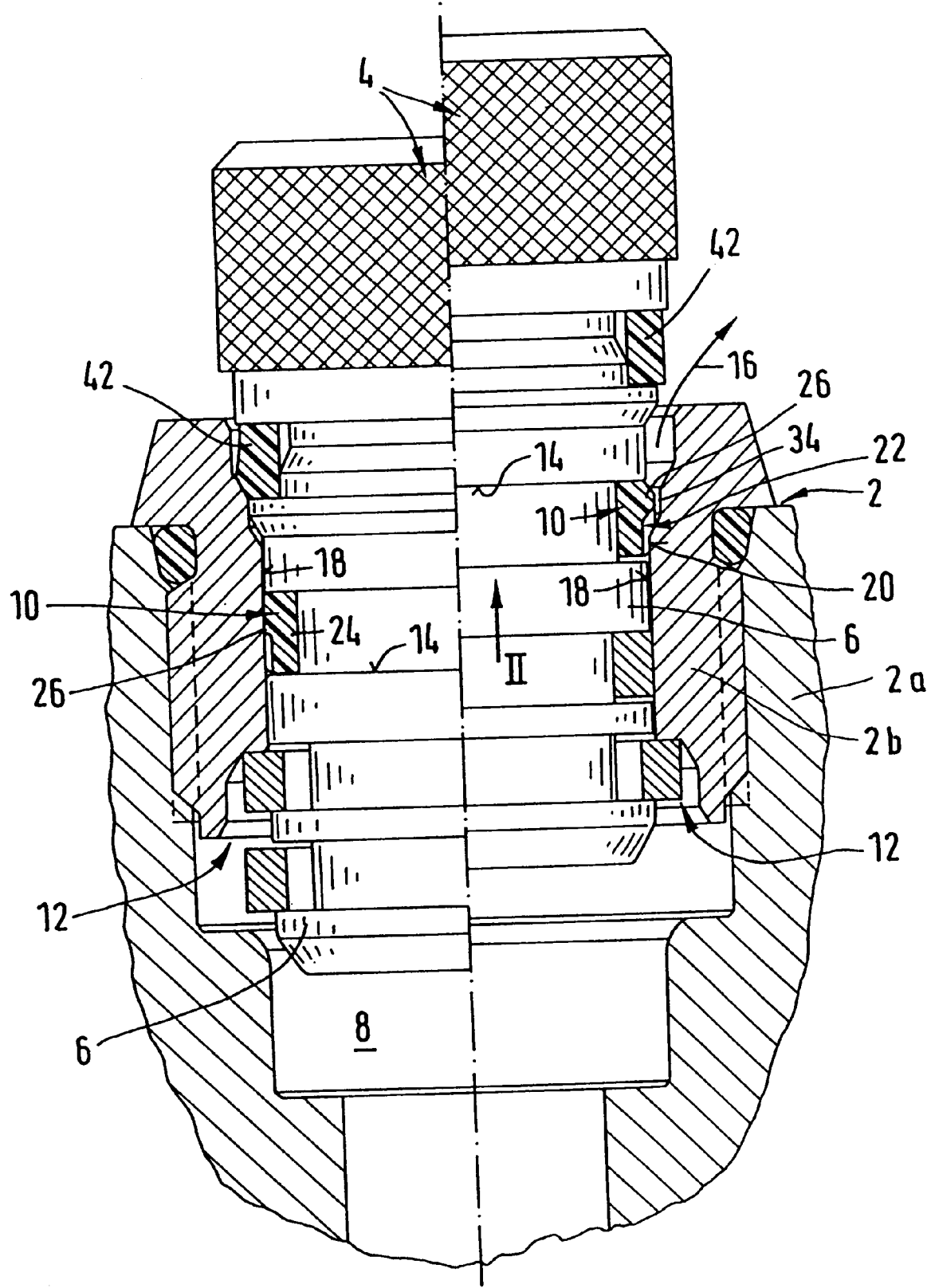

As can be gathered from FIGS. 1, 5, 7 and 8, respectively, a plug-in connector of the invention consists of a housing part (2) and a plug in part (4). The plug in part (4) can be inserted with a plug shaft (6) into a receiving opening (8) of the housing part (2) and, at that time, is sealed via at least one peripheral seal (10) with respect to the receiving opening (8) and can be locked via a locking arrangement (12) in order to prevent release.

The construction of the locking arrangement (12) in the examples is such that, on the one hand, a partially plugged in prelocked position (the right half of the figure) and on the other hand a fully locked position (left half) of the FIGS. 1, 5, 7, 8 are ensured. In the prelocked position, already secured against release, there is a seal which is incomplete, so that in the case of pressure application by a pressure medium, particularly compressed air, an audible leaking sound is produced. Here, a clearly limited leak is involved or a "choke gap" is formed by arranging the peripheral seal (10) in one annular groove (14) of the one connection part—plug part (4) in the illustrated embodiments of FIGS. 1–7 and the housing part (2) in FIG. 8—relative to the respective other housing part, whereby the pressure medium flows out in carefully metered form, corresponding to the arrows (16) and thereby produces a leaking sound, particularly in the form of whistling, hissing or the like. This may be evaluated as a signal that the correctly plugged in, fully locked position has not yet been attained, so that in this case the plug-in connector may attain the fully locked position by means of a continued plugging in. The precise embodiment of the locking arrangement (12) is not the object of the present invention and, for this reason, will not be explained here in greater detail in view of the fact that for this purpose the most varied embodiments exist. For example, in this respect, reference is made to the older German Patent Applications of the applicant with the file numbers 195 22 052.8, 195 23 830.3, 195 23 831.1 and 195 23 833.8, as well as to the corresponding European Patent Application Nos. 961007136.2, 96107137.0, 96107139.6 and 96107138.8, and, with respect to the embodiment according to FIG. 8, to the DE Application No. 196 21 5358. As an alternative to the embodiments of the locking device (12), wherein each brings about one positively locking catch, it is also possible to produce a prelocked state mainly through forced or forced form-fitted closure and at that time to produce the fully locked position only by means of a form-fitted catch. In this respect, reference is made to German Patent Application No. 196 23 9955.8.

The peripheral seal (10), located in the annular groove (14) of one connector part, interacts with a peripheral sealing surface (18) of the other connector part. In the examples shown in FIGS. 1 to 7, in which the peripheral seal (10) is located in the annular groove (14) of the plug in part (4), the sealing surface (18) is formed by a section of the interior peripheral surface of the opening (8) of the housing part (2).

Figures 8, 9:
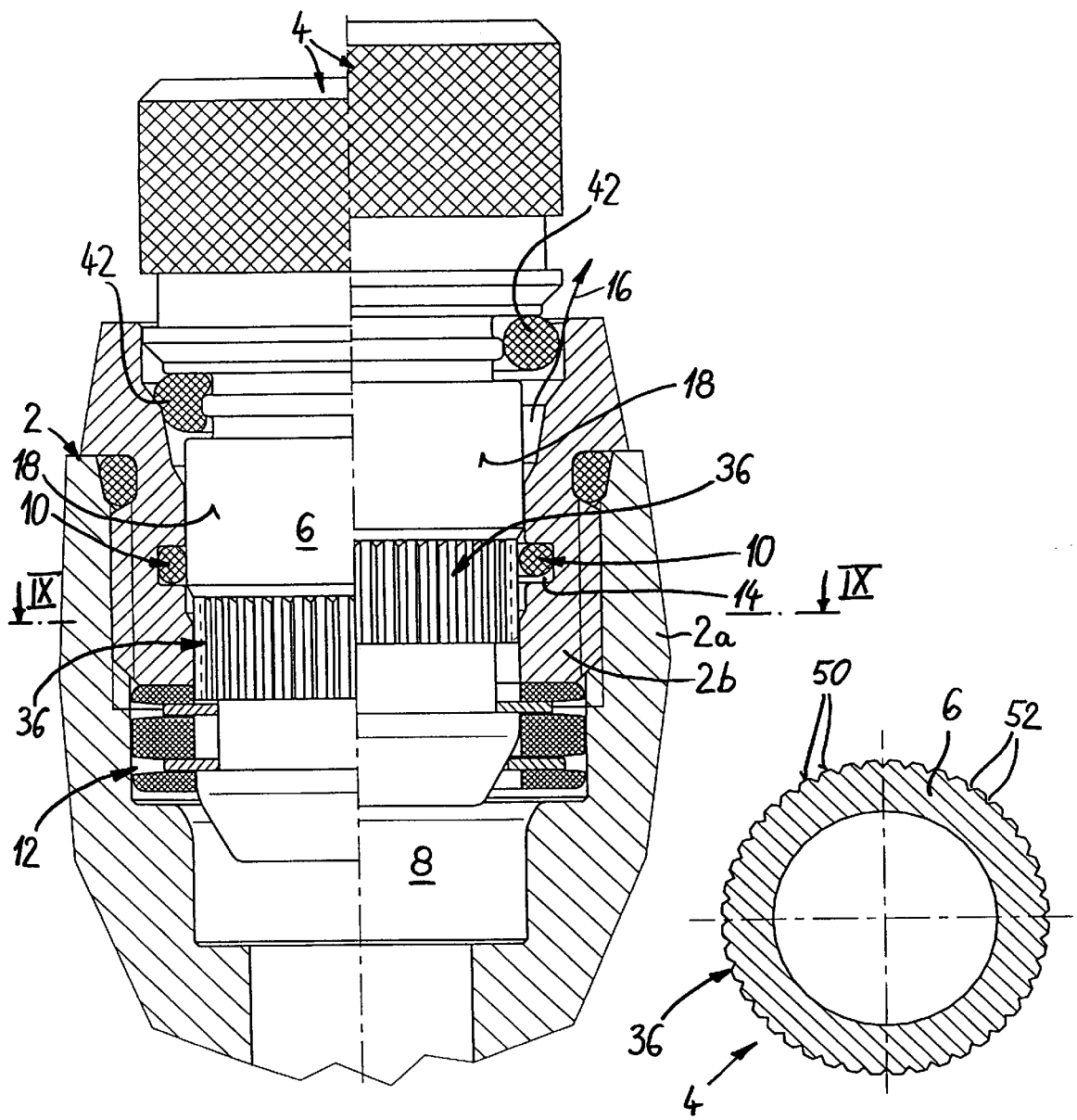
FIG. 8 shows a third embodiment of the plug-in connector of the invention, again in a representation which is analogous to FIG. 1, with the fully locked position (left) and prelocked position (right)
FIG. 9 shows a cross section through the plug in part in the leakage area of the plug shaft, i.e., along plane IX—IX of FIG. 8.

Alternatively, according to FIG. 8, it is also possible to arrange the peripheral seal (10) inside an interior annular groove (14) of the housing part (2), wherein the peripheral seal (10) interacts in this case with a sealing surface (18) present at the outer periphery of the plug shaft (6).

In accordance with the invention, provisions are made wherein the area of the peripheral seal (10) and/or of the sealing surface (18) is formed in such a way that the peripheral seal (10), located in the annular groove (14) of the one connector part (4 or 2), rests, already in the prelocked position (right half of FIGS. 1, 5, 7 and 8) via peripherally distributed contact points (20) in the radial direction which are at a distance from each other, against the other connector part (2 or 4), wherein respectively in the peripheral direction, between the contact points (20), axial leakage paths (22) are formed. Based on this arrangement of the invention, the peripheral seal (10) meshes in certain areas of the annular groove (14) already in the prelocked position, i.e., it is inserted in the radial direction in such a way that also in the event of leakage (arrow 16), the peripheral seal (10) is held securely in the annular groove (14) and cannot be ruptured.

In the example according to FIGS. 1 to 4, the contact points (20) and the leakage paths (22) are formed by means of a special construction of the peripheral seal (10). In the case of the embodiments according to FIGS. 5 and 6, as well as in variation thereto, to FIG. 7, i.e., according to FIGS. 5 to 7 with respect to the housing part 2, or according to FIGS. 8 and 9 with respect to the plug in part 4, a special construction of the connector part with the sealing surface (18) is provided.

In the following text, the first embodiment according to FIGS. 1 to 4 will first be explained in greater detail. Here, the peripheral seal (10) consists of an elastic profile ring (24) (see in particular FIGS. 2 to 4), which is divided into two axially adjacent areas, i.e., into a sealing area (26) with an annular cross section which is essentially constant across the periphery of the ring and which serves as a sealing ring, as well as into a leakage area (28) consisting of contact sections (30) which are mutually alternating in the peripheral direction, which form the contact points (20) and radial leakage recesses (32) created between same and forming the leakage paths (22) in the prelocked position. Preferably, the axial height of the sealing area (26) here corresponds approximately to the height of the leakage area (28) (see FIG. 3). Furthermore, it is particularly advantageous when the diameter of a circle defined by the contact sections (30) corresponds to the diameter of the sealing area (26) (see FIGS. 2, 3 and 4), since hereby a very simple, problem-free transfer from the prelocked position to the fully locked position is possible. As can be seen in FIG. 1, in the prelocked position (right half), the profile ring (24) is arranged with the sealing area (26) in the area of an expanded annular slot (34) which is formed between the plug shaft (6) and the receiving opening (8) and which abuts axially against the sealing surface (18) and is arranged with the leakage area (28) in the area of the sealing surface (18) which interacts in the fully locked position (left half of the figure) with the sealing area (26) in a sealing manner. Consequently, in the fully locked position, the peripheral seal (10) rests with the sealing area (26) across the entire periphery against the sealing surface (18) in a sealing manner.

Figure 2:
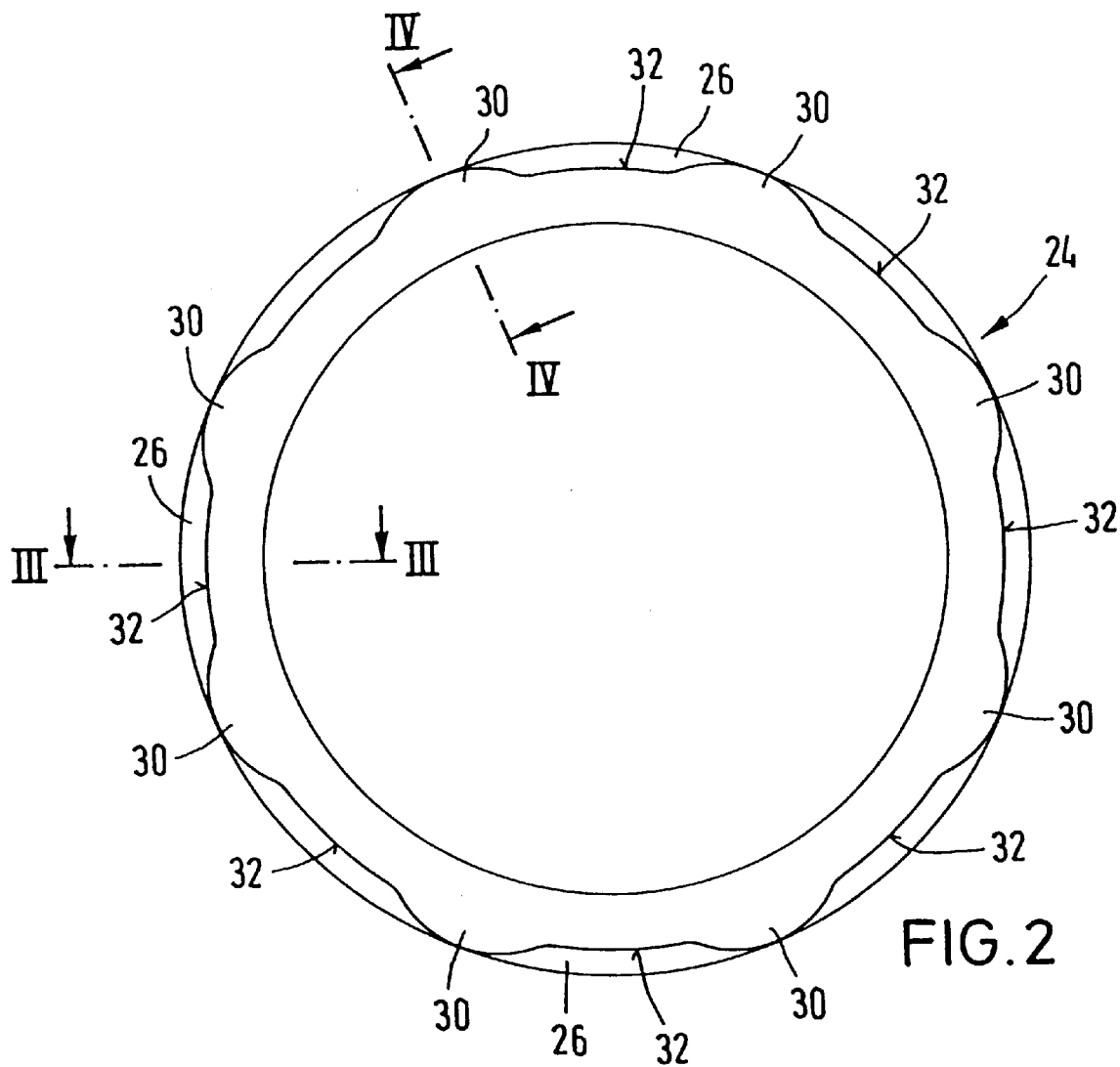
FIG. 2 shows a representation of a special peripheral seal which is an enlargement of FIG. 1 and which is a view in the direction of the arrow II of FIG. 1.
Figure 3:
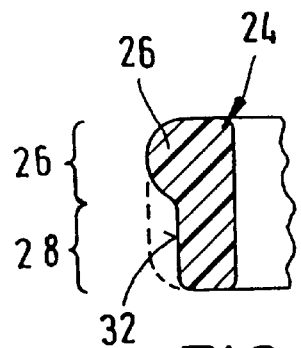
FIG. 3 shows a cross section through the peripheral seal along plane III—III of FIG. 2.
Figure 4:
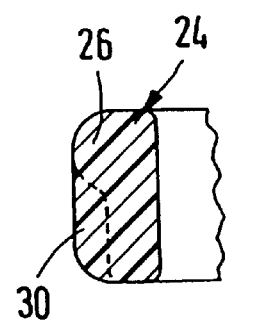
FIG. 4 shows a cross section through the peripheral seal along the plane IV—IV of FIG. 2.

According to FIG. 2, preferably eight contact sections (30), which are evenly distributed along the periphery, and accordingly also eight leakage recesses (32) are provided wherein the contact sections (30) are advantageously "knublike." However, a smaller or greater number of contact sections (30) may also be established; however, at least three contact sections (30) should be present which then can extend, respectively, across a greater peripheral area, depending on the peripheral path of the sealing surface (18).

With the embodiment shown, having the peripheral seal (10) in the outer annular groove (14) of the plug shaft (6), the sealing area (26) and the leakage area (28) are formed with the contact sections (30) and the leakage recesses (32) at the outer periphery of the profile ring (24) and the expanded annular slot (34) results from a cross-sectional expansion of the opening (8) of the housing part (2) which axially abuts against the sealing surface (18) of the housing part (2).

In an alternative [arrangement], not shown, i.e. when the peripheral seal or the special profile ring is located in an interior annular groove of the opening of the housing part, the sealing area and the leakage area would have to be formed along the interior periphery of the profile ring. Furthermore, the [presence of the] expanded ring slot would have to be ensured by means of a reduction in cross section of the plug shaft abutting against the outer sealing surface of the plug shaft.

Figure 5:
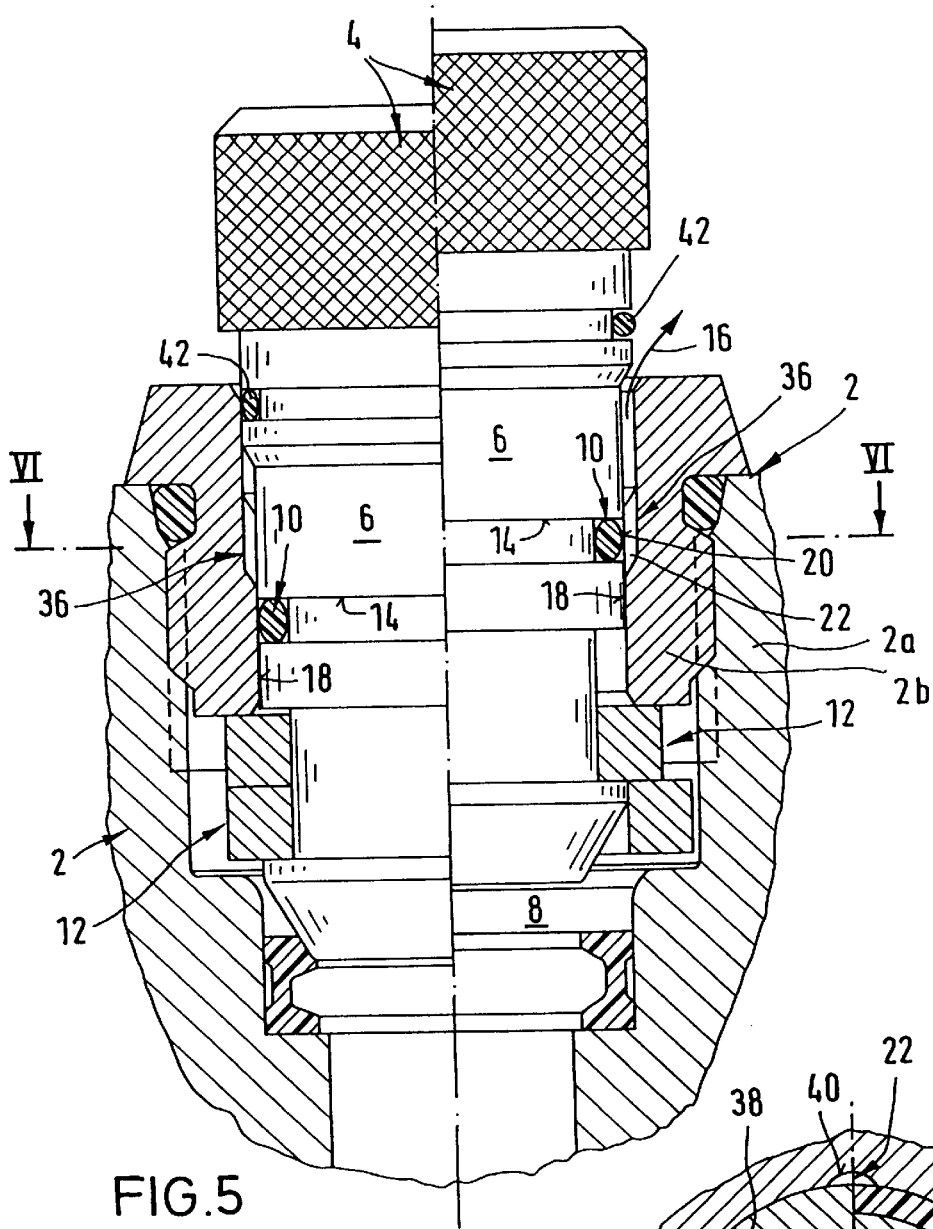
FIG. 5 shows a second embodiment of the plug-in connector of the invention in a representation which is analogous to FIG. 1, where the left side shows the fully locked position and the right side the prelocked position.
Figure 6:
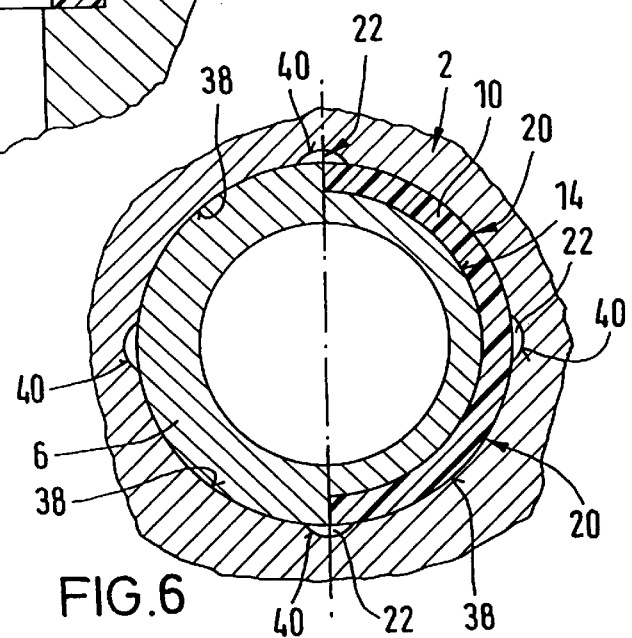
FIG. 6 shows a cross section through the plug-in connector along plane VI—VI of FIG. 5 (again, the left shows the fully locked position, and the right the prelocked position)

The embodiment demonstrated in FIGS. 5 and 6 distinguishes itself from the embodiment according to FIGS. 1 to 4 in that here the connector part having the sealing surface (18)—as shown by the housing part (2), which is axially adjacent to the sealing surface (18)—has a leakage area (36) with contact sections (38) which mutually alternate in peripheral direction and radial leakage recesses (40). In order to make possible a simple transfer from the prelocked position into the fully locked position here as well, it is advantageous when the diameter of a circle, defined by the contact sections (38), corresponds to the diameter of the sealing surface (18). In FIG. 6, a cross section through the leakage area (36) is shown, from which it can be seen that in the prelocked position (right half of the figure) the peripheral seal (10) is inserted in the annular groove (14). With this embodiment, a "normal" sealing ring, for example an O-ring, can advantageously be used.

According to FIG. 6, four contact sections (38) are preferably provided, which are evenly distributed along the periphery, extending preferably across a circular arc of only a little less than 90°, respectively, so that the leakage recesses (40) are relatively small or narrow, which may be advantageous for the production of the desired leaking sound. Naturally, the invention is not limited to the aforementioned number of contact sections (38) and recesses (40).

With the embodiment according to FIGS. 5 and 6, the contact sections (38) and the leakage recesses (40) are formed directly by the appropriate structure (formation) of the respective connector part—for example, as shown of the housing part (2) ("single-piece embodiment").

Figure 7:
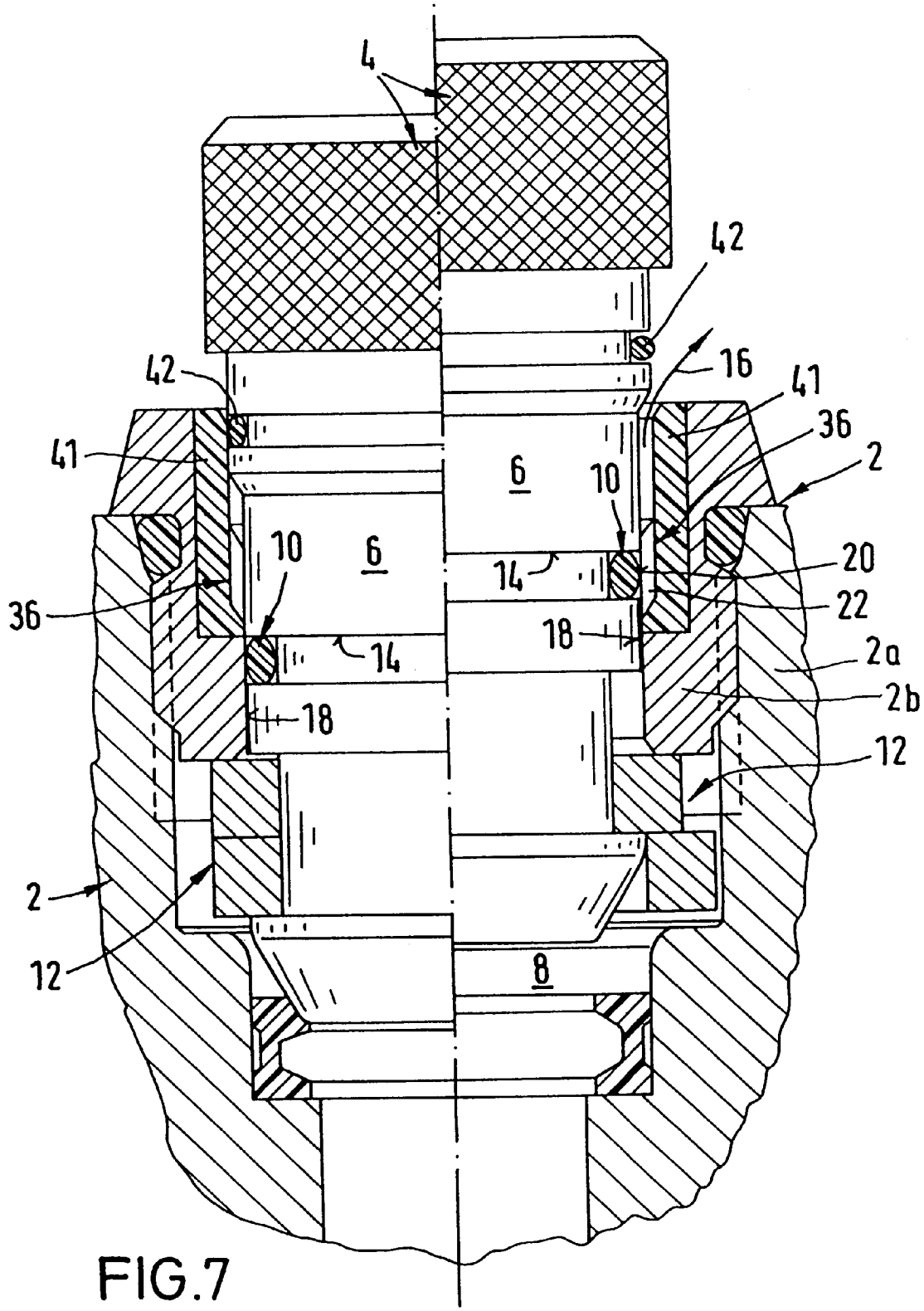
FIG. 7 shows a representation of the plug-in connector, corresponding to FIG. 5, in an advantageous variation of an embodiment.

Alternatively thereto, a variation to the embodiment is shown in FIG. 7, in which the contact sections (38) and the leakage recesses (40) are formed by means of an additional, casing-like structural element (41), preferably made of plastic, as shown, for example, as a bushing inserted into the housing part (2) ("two-part embodiment"). Otherwise, this embodiment according to FIG. 7 corresponds to that of FIGS. 5 and 6.

According to FIGS. 8 and 9, alternatively to the embodiments shown in FIGS. 5 and 6 as well as 7, the peripheral seal (10) may also be located in the inner annular groove (14) inside the opening (8) of the housing part (2), wherein the sealing surface (18) and the leakage area (36) are formed along the outer periphery of the plug shaft (6). As shown, the leakage area (36) is preferably formed by means of a peripheral knurl consisting in particular, flange-like raised areas (50) essentially extending in the axial direction and groove-like depressions (52), respectively located in between and forming the leakage paths. Here, with the raised areas (50), the leakage area (36) defines a circumferential circle whose diameter is preferably slightly smaller than the diameter of the sealing surface (18) to such a degree that the peripheral seal (10), on the one hand, is pressed in the fully locked position (left half of the FIG. 8), due to placement against the sealing surface (18) with an elastic cross-sectional form change, into the inner annular groove (14), however—on the other hand—is held in the prelocked position (right half of FIG. 8) by being placed against the leakage area (36) essentially without deformation, inside the inner annular groove (14), thus being secured against displacement caused by the flow.

It should also be mentioned that in addition to the peripheral seal (10), bringing about the actual pressure seal, preferably a dirt seal (42) is provided which, in the fully locked position (left half of FIGS. 1 and 5), closes the mouth of the opening (8) in such a way that a penetration of dirt, dust, moisture and the like is prevented. Preferably, this dirt seal (42) is also accommodated in an outer annular groove of the plug shaft (6). With the embodiment according to FIG. 8, special measures are provided at that point in order to form the dirt seal (42) as an "elastic stop element" which, when the fully locked position has been obtained, brings about a noticeable increase in the plugging strength (plug control). Here, reference is made to DE Utility Model Application No. 296 10 496.5.

Furthermore, provisions are preferably made wherein for the purpose of releasing the plug part (4), locked by means of the locking arrangement (12), the housing part (2) consists of two releasably connected parts, a base part (2a) and an insert part (2 b), preferably in the form of a cap screw, in that upon release of the insert part (2b) from the base part (2a), the plug part (4) can be removed together with a component of the locking arrangement (12) and the insert part (2b). In this case, in the arrangement according to FIG. 7, the additional structural component (41) or the bushing is connected to the insert part (26) ("two-part arrangement" of the insert part (2b)).

It should be understood that the foregoing relates only to preferred embodiments of the present invention, and that changes and modifications thereto may be made without departing from the spirit and scope of the following claims.

We claim:

1. Plug-in connector for pneumatic pressure medium system, comprising:

two connector parts including a housing part (2) and a plug part (4);

the plug part (4) having a plug shaft (6);

at least one peripheral seal (10) located in an annular groove (14) on one of the connector parts;

the other connector part having a peripheral sealing surface (18) with which the seal interacts;

the housing part having an opening (8) into which the plug shaft is insertable in a sealed manner;

a locking arrangement (12) associated with the housing part and operative to secure the plug part against release, the locking arrangement (12) being operative to provide a partially-plugged prelocked position and a fully-plugged fully locked position of the plug part, wherein in the prelocked position a seal is present which is incomplete to the extent that in response to the application of pressure with a pressure medium, a limited perceptible leak occurs to produce an audible leaking, and in the fully locked position the peripheral seal (10) rests against the sealing surface (18) to provide a pressurized seal, and;

the area of the peripheral seal (10) and the sealing surface (18) has peripherally distributed contact points (20) arranged at a distance from each other and resting radially against the housing part in the prelocked position, so that axial leakage paths (22) are formed in the peripheral direction between the contact points (20).

2. Plug-in connector in accordance with claim 1, characterized in that the peripheral seal (10) comprises an elastic profile ring (24) which is divided into a sealing area (26) with an annular cross section which is substantially constant along the periphery and a leakage area (28) axially adjacent to the sealing area and formed of contact sections (30) which alternate in the peripheral direction and form contact points (20) and radial leakage recesses (32) forming the leakage paths (22).

3. Plug-in connector in accordance with claim 2, further comprising:

an expanded ring slot (34) formed between the plug shaft (6) and the opening (8) and abutting against the sealing surface (18);

the profile ring (24) being arranged in the prelocked position with the sealing area (26) in the area of the expanded ring slot (34); and the leakage area (28) in the area of the sealing surface (18) of the connector part (2) interacting in the fully locked position with the sealing area (26) in a completely sealing manner.

4. Plug-in connector in accordance with claim 3, wherein:

the peripheral seal (10) is located in an outer annular groove (14) of the plug shaft (6); and the sealing area (26) and the leakage area (28), with the contact sections (30) and the leakage recesses (32) at the outer periphery of the profile ring (24), as well as the expanded ring slot (34), are formed by a cross sectional expansion of the opening (8) of the housing part (2) abutting against the sealing surface (18).

5. Plug-in connector in accordance with claim 3, wherein:

the peripheral seal is located in an inner annular groove of the receiving opening of the housing part, wherein the sealing area and the leakage area with the contact sections and the leakage recesses at the inner periphery of the profile ring, as well as the expanded ring slot, are formed by means of a cross sectional reduction of the plug shaft abutting against the sealing surface.

6. Plug-in connector in accordance with claim 1, characterized in that the connector part (2) of the sealing surface (18) has axially adjacent thereto, a leakage area (36) with contact sections (38), alternating in peripheral direction, and radial leakage recesses (40).

7. Plug-in connector in accordance with claim 6, characterized in that the contact sections (38) and the leakage recesses (40) are formed on the connector part (2).

8. Plug-in connector in accordance with claim 6, characterized in that the contact sections (38) and the leakage recesses (40) are formed on an additional, casing-like structural component (41) connected to the connector part (2).

9. Plug-in connector in accordance with claim 6, characterized in that the peripheral seal (10) is formed as an O-ring, and is arranged in the prelocked position in the leakage area (36) and in the fully locked position in the area of the abutting sealing surface (18).

10. Plug-in connector in accordance with claim 6, characterized in that the peripheral seal (10) is located in an outer annular groove (14) of the plug shaft (6), and the sealing surface (18) and the leakage area (36) are formed within the opening (8) of the housing part (2).

11. Plug-in connector in accordance with claim 7, characterized in that the peripheral seal (10) is located in an inner annular groove (14) inside the opening (8) of the housing part (2), and the sealing surface (18) and the leakage area (36) are formed at the outer periphery of the plug shaft (6).

12. Plug-in connector in accordance with claim 11, characterized in that the leadkage area (36) is formed by means of substantially axially extending, flange-like elevations (50) and groove-like depressions (52) located between respective elevations and forming the leakage paths.

13. Plug-in connector in accordance with claim 11, characterized in that the section of the plug shaft (6) forming the sealing surface (18) has a diameter which is only slightly larger than the circumference defined by the leakage area (36), so that the peripheral seal (10) in the fully locked position by resting against the sealing surface (18) is pressed, while undergoing elastic cross sectional alteration, into the inner annular groove (14) and is held in the prelocked position by resting against the leakage area (36) in a manner substantially free of deformation inside the inner annular groove (14).

* * * * *